US006372187B1

(12) United States Patent
Madden et al.

(10) Patent No.: US 6,372,187 B1
(45) Date of Patent: Apr. 16, 2002

(54) ALKALINE SORBENT INJECTION FOR MERCURY CONTROL

(75) Inventors: Deborah A. Madden, Boardman; Michael J. Holmes, Washington Township, Stark County, both of OH (US)

(73) Assignee: McDermott Technology, Inc., New Orleans, LA (US)

( * ) Notice: Subject to any disclaimer, the term of this patent is extended or adjusted under 35 U.S.C. 154(b) by 0 days.

(21) Appl. No.: 09/206,465

(22) Filed: Dec. 7, 1998

(51) Int. Cl.[7] ................................................. B01J 8/00
(52) U.S. Cl. .................. 422/171; 422/172; 423/243.08; 423/243.11; 423/244.07; 423/244.08; 110/345
(58) Field of Search ................................ 422/171, 172; 423/243.08, 243.11, 244.07, 244.08; 110/345; 95/71, 234

(56) References Cited

U.S. PATENT DOCUMENTS

| 3,855,387 A | 12/1974 | Brockmiller et al. ........ 423/210 |
| 3,892,837 A | 7/1975 | Uchiyama et al. .......... 423/242 |
| 3,981,972 A | 9/1976 | Hishinuma et al. ......... 423/244 |
| 4,094,879 A | 6/1978 | Bates et al. ................. 260/299 |
| 4,190,709 A | 2/1980 | Hodgkin ...................... 521/39 |
| 4,230,183 A | 10/1980 | Kalfoglou ................... 166/274 |
| 4,273,747 A | 6/1981 | Rasmussen ................. 423/210 |
| 4,283,303 A | 8/1981 | Ellis ............................ 252/188 |
| 4,285,819 A | 8/1981 | Yen et al. .................... 210/679 |
| 4,377,484 A | 3/1983 | Nasrallah .................... 210/698 |
| 4,578,195 A | 3/1986 | Moore et al. ............... 210/679 |
| 4,857,183 A | 8/1989 | Bommer ...................... 210/127 |
| 4,889,698 A | 12/1989 | Moller et al. ............... 423/210 |
| 4,889,701 A | 12/1989 | Jones et al. ................. 423/220 |
| 4,975,264 A | 12/1990 | Franken ...................... 423/522 |
| 5,139,982 A | 8/1992 | Ayala et al. ................. 502/182 |
| 5,168,065 A | 12/1992 | Jankura et al. ............... 436/55 |
| 5,238,665 A | 8/1993 | Lerner ......................... 423/240 |
| 5,246,471 A | 9/1993 | Bhat et al. ..................... 55/223 |
| 5,308,509 A | 5/1994 | Bhat et al. ................... 210/770 |
| 5,354,363 A | 10/1994 | Brown, Jr. et al. ........... 95/134 |
| 5,357,002 A | 10/1994 | Lezzi et al. .............. 525/332.2 |
| 5,372,940 A | 12/1994 | Sakamoto et al. .......... 435/195 |
| 5,380,747 A | 1/1995 | Medford et al. ............ 514/423 |
| 5,405,593 A | 4/1995 | Knudson ................ 423/244.03 |
| 5,428,154 A | 6/1995 | Gansow et al. ............. 540/465 |

(List continued on next page.)

OTHER PUBLICATIONS

R. D. Vidic and J. B. McLaughlin, "Uptake of Elemental Mercury Vapors by Activated Carbons," *Journal of the Air and Waste Management Association*, vol. 46, Mar. 1996, pp. 241–250.

J. G. Noblett, Jr. et al, "Control of Air Toxics from Coal–Fired Plants Using FPG Technology," presented at the RPRI Second International Conference on Managing Hazardous Air Pollutants, Washington, DC, Jul. 1999, 15 pages.

R. Chang and D. Owens, "Developing Mercury Removal Methods for Power Plants," *EPRI Journal*, Jul./Aug. 1994, pp. 46–49.

(List continued on next page.)

Primary Examiner—Steven P. Griffin
Assistant Examiner—Maribel Medina Sarabria
(74) Attorney, Agent, or Firm—R. C. Baraona; Eric Marich

(57) ABSTRACT

A mercury removal system for removing mercury from combustion flue gases is provided in which alkaline sorbents at generally extremely low stoichiometric molar ratios of alkaline earth or an alkali metal to sulfur of less than 1.0 are injected into a power plant system at one or more locations to remove at least between about 40% and 60% of the mercury content from combustion flue gases. Small amounts of alkaline sorbents are injected into the flue gas stream at a relatively low rate. A particulate filter is used to remove mercury-containing particles downstream of each injection point used in the power plant system.

20 Claims, 2 Drawing Sheets

U.S. PATENT DOCUMENTS

| | | | |
|---|---|---|---|
| 5,459,040 A | 10/1995 | Hammock et al. | 435/7.1 |
| 5,459,276 A | 10/1995 | Kuhn et al. | 548/159 |
| 5,500,196 A | 3/1996 | Rogers et al. | 423/242.1 |
| 5,520,897 A | 5/1996 | Rogers et al. | 423/242.1 |
| 5,564,105 A | 10/1996 | Alvino et al. | 588/20 |
| 5,622,996 A | 4/1997 | Fish | 521/33 |
| 5,672,323 A | 9/1997 | Bhat et al. | 422/172 |
| 5,750,351 A | 5/1998 | Medford et al. | 435/7.21 |
| 5,773,209 A | 6/1998 | Medford et al. | 435/7.24 |
| 5,773,231 A | 6/1998 | Medford et al. | 435/7.24 |
| 5,783,596 A | 7/1998 | Medford et al. | 514/423 |
| 5,785,735 A | 7/1998 | Raskin et al. | 75/711 |
| 5,792,787 A | 8/1998 | Medford et al. | 514/423 |
| 5,795,548 A | 8/1998 | Madden et al. | 422/171 |
| 5,807,884 A | 9/1998 | Medford et al. | 514/423 |
| 5,809,693 A | 9/1998 | Chet et al. | 47/58 |
| 5,811,449 A | 9/1998 | Medford et al. | 514/423 |
| 5,814,288 A | 9/1998 | Madden et al. | 423/244.01 |
| 5,814,591 A | 9/1998 | Mills et al. | 510/238 |
| 5,821,260 A | 10/1998 | Medford et al. | 514/423 |
| 5,827,352 A | 10/1998 | Altman et al. | 95/58 |
| 5,834,525 A | 11/1998 | Fish | 521/33 |
| 5,846,959 A | 12/1998 | Medford et al. | 514/165 |

OTHER PUBLICATIONS

K. Felsvang et al., "Air Toxics Control by Spray Dryer Absorption Systems," presented at Power–Gen '92, Orlando, FL, Nov. 1992, pp. VI–1 thru VI–17.

R. Chang and G. R. Offen, Mercury emission control technologies: An EPRI synopsis, *Power Engineering*, Nov. 1995, pp. 51–57.

"Emission Factors Handbook: Guidelines for Estimating Trace Substance Emissions from Fossil Fuel Steam Electric Plants," *EPRI*, TR–105611s, Nov. 1995, pp.: Cover, Report Summary, 2, 2–11, 2–12, and 2–13.

Advertisement by The Dow Chemical Company, Properties of EDTA, DTPA, HEDTA, and NTA, 1974, 2 pgs.

E. H. Hall, Status Report from Battelle Memorial Institute, Columbus Ohio, "Mercury Emissions and Controls," May 1, 1994, 94TEC–1, 49 pages.

R. Meu, "The Fate of Mercury in Coal–Fired Power Plants and the Influence of Wet Flue–Gas Desulphurization," *Water, Air and Soil Pollution*, 56:21–33, 1991, pp. 21–29.

R. Gleiser et al., "Mercury Emission Reduction Using Activated Carbon with Spray Dryer Flue Gas Desulfurization," presented at 36th Annual Meeting American Power Conference, Chicago, Apr. 25–27, 1994, pp. 452–457.

R. Gleiser et al, "Control of Mercury from MSW Combustors by Spray Dryer Absorption Systems and Activated Carbon Injection," MSW Conference Proceedings, Williamsburg, VA, 1993, pp. 106–122.

J. Peterson et al., "Mercury Removal by Wet Limestone FGD Systems: EPRI HSTC Test Results," 94–RP114B.01, presented at the 87th Annual Meeting & Exhibition of Air & Waste Management Association, Cincinnati, Ohio, Jun. 19–24, 1994, pp. 1–16.

R. Chang, et al., "Pilot Scale Evaluation of Activated Carbon for the Removal of Mercury at Coal–Fired Utility Power Plants," presented at the 2nd International Hazard Pollution Managemetn, Washington, DC, Jul. 13–15, 1993, pp. 1–17.

B. K. Gullett, et al., "Bench–Scale Sorption and Desorption of Mercury with Activated Carbon," presented at International Conference MWC, Williamsburg, VA, Mar. 30–Apr. 2, 1993, 8 pages.

A. Licata et al., "An Economic Alternative to Controlling Acid Gases, Mercury and Dioxin from MWCs," 94–MP17.06, presented at the 87th Annual Meeting & Exhibition for Air & Waste Management Association, Cincinnati, Ohio, Jun. 19–24, 1994, pp. 1–21.

R. Chang et al., "Sorbent Injection for Flue Gas Mercury Control," 94–WA68A.01, presented at the Air & Waste Management Association Conference, Cincinnati, Ohio, Jun. 1994, 13 pages.

C. Jones, "Consensus on air toxics eludes industry to date," *Power*, Oct. 1994, pp. 51–52, 55–56, 58–59.

J. R. Morency, "Control of Mercury in Fossil Fuel–Fired Power Generation," presented at DOE Contractors Meeting, Pittsburgh, PA, Jul. 21, 1994, pp. 1–7.

*Steam/its generation and use*, 40th Edition, The Babcock & Wilcox Company, ©1992, pp.:cover, ii, 35–1 thru 35–16.

K. E. Redinger et al., "Mercury Emissions Control in RGD Systems," presented at the EPRI/DOE/EPA Combined Utility Air Pollutant Control Symposium, Washington, DC, Aug. 25–29, 1997, 17 pages.

M. J. Holmes, et al., "Advanced Emissions Control Development Program," presented at the Advanced Coal–Based Power and Environmental Systems '98 Conference, Morgantown, West VA, Jul. 21–23, 1998, 16 pages.

G. A. Farthing et al., "B&W's Advanced Emissions Control Development Program," presented at the 20th International Technical Conference on Coal Utilization & Fuel Systems, Clearwater, Florida, Mar. 20–23, 1995 12 pages.

K. E. Redinger and A. P. Evans, "Mercury Speciation and Emissions Control in FGD Systems," presented at the 22nd International Technical Conference on Coal Utilization & Fuel Systems, Mar. 17–20, 1997.

M. J. Holmes et al., "Control of Mercury in Conventional Flue Gas Emissions Control Systems," presented at the Managing Hazardous Air Pollutants Conference, Washington, DC, Nov. 12–14, 1997, 17 pages.

K. E. Redinger et al., "Mercury Emissions Control in RGD Systems," presented at the EPRI/DOE/EPA Combined Utility Air Pollutant Control Symposium, Washington DC, Aug. 25–29, 1997, pp. 1–17.

C. D. Livengood et al., "Improved Mercury Control in Wet Scrubbing Through Modified Speciation," presented at the EPRI/DOE/EPA Combined Utility Air Pollutant Control Symposium, Washington, DC, Aug. 25–29, 1997, 16 pages.

ALKALINE SORBENT INJECTION FOR MERCURY CONTROL

The subject matter of the present invention was developed under a research contract with the U.S. Department of Energy (DOE), Contract No. DE-FC22-94PC9425 1, and under a grant agreement with the Ohio Coal Development Office (OCDO), Grant Agreement No. CDO/D-922-13. The governments of the United States and Ohio have certain rights in the invention.

FIELD AND BACKGROUND OF THE INVENTION

The present invention relates generally to the field of combustion and flue gas cleanup methods and apparatus and, in particular, to a new and useful apparatus and method for removing mercury from flue gases generated by combustion, through the use of an alkaline sorbent.

In recent years, the U.S. Department of Energy (DOE) and the U.S. Environmental Protection Agency (EPA) have supported research to measure and control the emissions of Hazardous Air Pollutants (HAPs) from coal-fired utility boilers and waste to energy plants. The initial results of several research projects showed that the emissions of heavy metals and volatile organic carbons (VOCs) are very low, except for mercury (Hg). Unlike most of the other metals, mercury remains in the vapor phase at relatively low temperatures and does not condense onto fly ash particles. Therefore, it cannot be collected and disposed of along with fly ash like the other metals. To complicate matters, mercury can exist in its oxidized ($Hg^{++}$) or elemental ($Hg^0$) form and each is affected differently by subsequent downstream pollution control equipment.

Most of the recent efforts to capture and remove mercury from the flue gas produced by coal-fired units have concentrated on gas-phase reactions with introduced reagents such as activated carbon.

The subject of mercury emissions by the utility and waste to energy industries is a new area being investigated by both the DOE and EPA.

Approximately 75% of existing coal-fired power plants are not equipped with wet flue gas desulfurization (WFGD) systems. These systems most often control particulate emissions with electrostatic precipitators (ESP's) and baghouses. With possible mercury emissions regulation for the electric power industry pending, it is imperative to have cost-effective mercury capture technologies available for those power plants lacking WFGD systems.

It is known to inject limestone in dry powder form into the flue gases in the upper furnace cavity of a boiler for the purpose of capturing $SO_2$ from the flue gases. A discussion of systems using this process can be found in U.S. Pat. Nos. 5,795,548 and 5,814,288 to Madden et al. These systems or processes are also referred to as Enhanced Limestone Injection Dry Scrubbing processes/systems, or E-LIDS systems™, a trademark of The Babcock & Wilcox Company. Please refer to FIG. 1.

For the E-LIDS™ processes or systems, a particulate collection device is located downstream of the air heater to remove particulate matter from the flue gases exiting the boiler. Any one of several known types of particulate separation techniques may be employed for this purpose, including inertial impaction separators, fabric filters (baghouses) and ESP's. Flue gases exiting from the particulate collector then pass through a dry scrubber where they are contacted by a slurry containing calcium hydroxide. Calcium is introduced in stoichiometric molar ratios of calcium to sulfur much greater than 1.0 and usually about 2.0 mole/mole. The high molar ratios are necessary to achieve good reactions between the calcium and sulfur present in the flue gases.

Additional $SO_2$ removal can take place in a dry scrubber located downstream of the particulate control device, followed by a final particulate collector in which coal flyash, spent sorbent and unreacted sorbent particles are collected. A baghouse is preferred as the final particulate control device because of the additional $SO_2$ removal it yields as the flue gases pass through the filter cake on the filter bags. Thus, the E-LIDS™ process or system combines sorbent injection, dry scrubbing and fabric filtration.

SUMMARY OF THE INVENTION

It has been discovered that the E-LIDS™ process also has the effect of removing 95% of the total amount of mercury present in the furnace system. Surprisingly, it was discovered that 82% of the mercury removal occurred using the sorbent injection and first particulate collector alone.

It is an object of the present invention to provide a cost efficient solution for reducing mercury emissions in flue gases that is easily retrofit into existing power plant systems.

Accordingly, one aspect of the present invention is drawn to a mercury removal system for removing mercury from a flue gas generated in utility and waste to energy combustion systems having a boiler and a stack, comprising: particulate removal means for separating and removing particulate matter containing mercury from the flue gas, the particulate removal means located between the boiler and the stack; and sorbent injection means for providing an alkaline sorbent in one of powdered and slurried form to at least one location upstream of the particulate removal means in the power plant, the alkaline sorbent being provided in a stoichiometric molar ratio of calcium to sulfur in a range of about 0.001 mole of an alkaline earth or an alkali metal/mole sulfur and 1.0 mole of an alkaline earth or an alkali metal/mole sulfur. The alkaline sorbents are injected into a power plant system at one or more locations and at stoichiometric molar ratios of and alkaline earth or an alkali metal to sulfur of less than 1.0 to remove at least between about 40% and 60% of the mercury content from power plant emissions. Small amounts of alkaline sorbents are thus injected into the flue gas stream at a relatively low rate. A particulate filter is used to remove mercury-containing particles downstream of each injection point used in the power plant system.

Under certain circumstances, it may be desirable to use a combination of both an alkaline earth sorbent and an alkali metal sorbent to accomplish mercury removal according to the present invention.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

Figure 1:
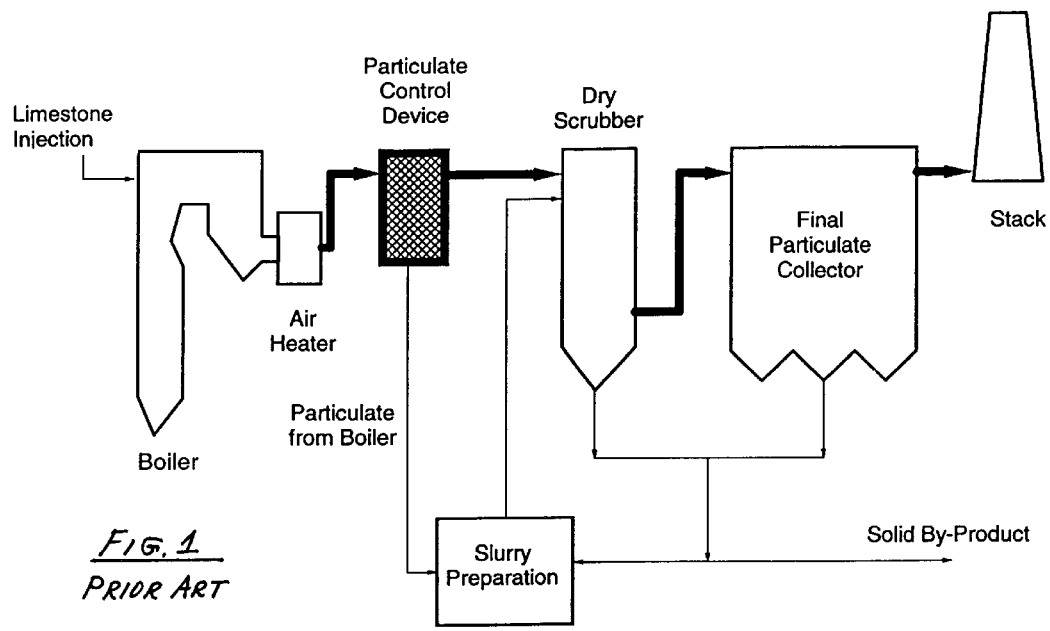
FIG. 1 is a schematic diagram of a power plant installation incorporating an E-LIDS™ system according to the prior art.
Figure 2:
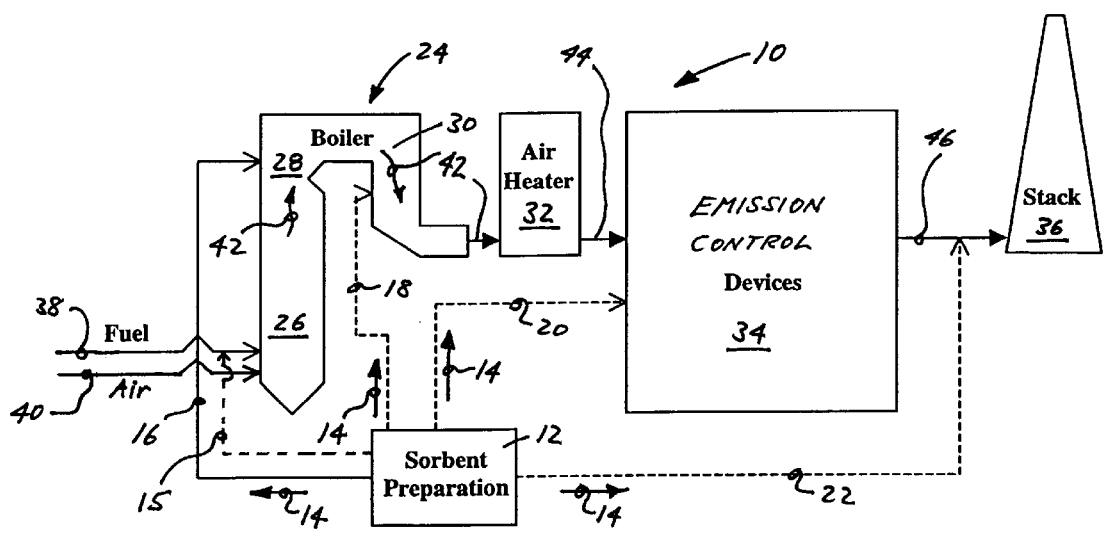
FIG. 2 is a schematic diagram of a power plant installation incorporating the alkaline sorbent injection system for mercury control according to the present invention.

Referring now to the drawings, where in like reference numerals designate the same or functionally similar elements throughout the several drawings, FIG. 2 shows a power plant installation or system 10 having an alkaline sorbent preparation means 12 for preparing an alkaline sorbent 14 which is conveyed via lines 15, 16, 18, 20, and/or 22 to various locations of system 10. The power plant system 10 includes a boiler 24 having a lower furnace region 26, an upper furnace region 28, a convection pass 30, an air heater 32, emissions control devices 34, and a stack 36. Fuel 38, typically coal, and air 40 for combustion are provided into the boiler 24 to generate heat via combustion.

In the system 10 shown, hot flue gases 42, containing contaminants such as mercury, are generated in the boiler 24 furnace and rise through upper furnace region 28. The flue gases 42 then pass through the convection pass section 30 of the boiler 24 before entering air heater 32. After air heater 32, cooled flue gases 44 may be treated by one or more emissions control devices, generally designated 34. Desulfurized and cleaned (of particulate) flue gases 46 exit from devices 34 and are conveyed to stack 36 for release into the atmosphere.

Emissions control devices 34 may include baghouses, electrostatic precipitators, WFGD systems, wet scrubbers, dry scrubbers, selective catalytic reduction (SCR), selective non-catalytic reduction (SNCR), and impact-type particle separators. However, as noted above, many existing power plant systems 10 do not have WFGD systems, and use only an ESP or baghouse to control emissions. In systems where a WFGD system is installed, typically an ESP will be placed upstream to remove particulate matter prior to the flue gas entering the WFGD system.

As illustrated in FIG. 2, the alkaline sorbent may be delivered into the flue gases 42, 44, 46 at one or more locations of the upper furnace region 28, the convection pass 30, at the emissions control devices 34, prior to exiting the system 10 through the stack 36, or in with the fuel 38. Suitable alkaline sorbents 14 include sorbents containing elements selected from the alkali metals (Group 1a of the periodic table) such as sodium, or the alkaline earths (Group 2a of the periodic table) which includes calcium-based sorbents such as limestone and lime. The alkaline sorbent 14 may be in slurry or powdered form, and the means 15, 16, 18, 20, and 22 would of course be designed to convey the sorbent 14 to the desired locations in whatever form it is provided, whether in slurry or powder form.

Alkaline sorbent injection for mercury control includes the injection of any alkaline sorbent 14 into a flue gas 42, 44, 46 stream anywhere from the boiler 24 to the exit of the stack 36 at very small amounts (Ca/S stoichiometries less than 1.0 mole/mole) for the purpose of mercury capture. The sorbent 14 can be injected into the flue gas 42, 44, 46 stream dry or as slurry. The injected sorbent 14 absorbs or adsorbs the mercury into the particulate phase allowing for the collection of the mercury with the solids in the flue gas in downstream emissions control devices 34. The temperatures for injection of the sorbent range from those typical at the coal input to the boiler (3000° F.) and in the upper portion 28 of a furnace (2300° F.) to very low temperatures such as at the outlet of a wet scrubber (150° F.) Each facility's flue, gas constituents and equipment will dictate the type or sorbent and where (what temperature) to inject. In FIG. 2, the solid arrow (lines 16) from the sorbent preparation system 12 is a recently tested application of the present invention that is known to work. This is injection into the upper furnace region 28. The dashed arrows from the sorbent preparation system 12 are other injection points for sorbent 14 injection for mercury capture according to the principles of the invention that are expected to work; however, these applications are yet to be tested (examples include introduction with the coal feed 38, in the convection pass 30, anywhere in the flue gas desulfurization and particulate control device section 34 and before the stack 36).

Recent testing performed as part of the above-identified contract with the DOE has surprisingly demonstrated that the injection of even very small amounts of limestone sorbent 14 (i.e., calcium stoichiometries between 0.04 and 0.35 mole Ca/mole S) via line 16 into the upper furnace region 28 of the boiler 24 can achieve modest mercury removal from the flue gases 42. This is a new and unique application for alkaline sorbent injection. Previously, such injection of alkaline sorbent was used for the removal of $SO_2$ from flue gases, and it was also injected at much higher flow rates (i.e., calcium stoichiometries between 1.4 and 2.0 mole Ca/mole S). Table 1 below summarizes the sorbent injection operating conditions for the one specific application tested, while FIG. 3 graphically illustrates the test data obtained when alkaline sorbent (limestone) was injected into the upper furnace region 28 of boiler 24.

TABLE 1

Sorbent Injection Operating Conditions for Specific Test Application

| Sorbent | Limestone | Limestone |
| --- | --- | --- |
| # of sorbent/# of flue gas | 0.002 | 0.00025 |
| Ca/S ratio, mole/mole | 0.35 | 0.04 |
| Sorbent/Hg Wt. ratio | 125,000:1 | 16,000:1 |
| Injection Temp, ° F. | 2200 | 2200 |
| ESP Temp, ° F. | 350 | 350 |
| Total Hg Removal | 56% | 45% |

Figure 3:
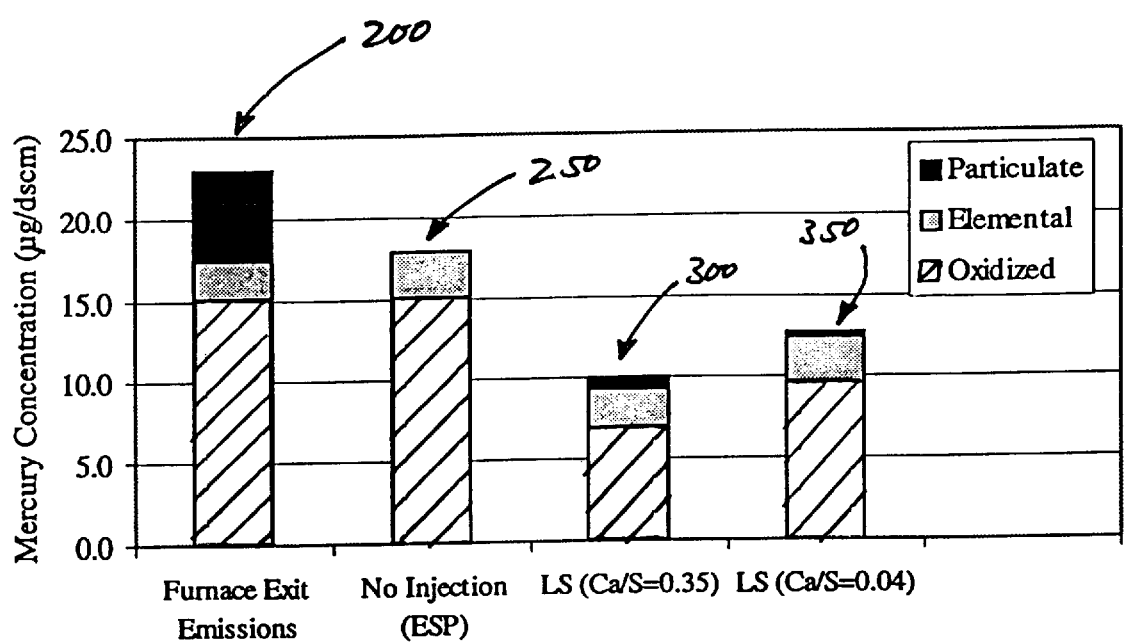
FIG. 3 is a bar graph showing amounts of mercury captured, as measured by testing equipment, following flue gas treatments according to the present invention as compared to unfiltered flue gases.

As illustrated in FIG. 3, bar 200 represents the uncontrolled emissions from a test power plant system 10 in which about 70% of the mercury is oxidized mercury, another approximately 20% is particulate phase mercury, and the remainder is elemental mercury. About 23 $\mu$g/dscm (23 micrograms/dry standard cubic meters) total of mercury was observed in the uncontrolled emissions.

Bar 250 shows the effect of using only an electrostatic precipitator on mercury removal. Approximately 18% of the total mercury present in the uncontrolled emissions (bar 200) is removed.

A comparison of bar 200 with bars 300 and 350, representing emissions when an alkaline sorbent 14 has been injected into the power plant system 10, clearly shows the beneficial reduction in mercury emitted into the atmosphere by the furnace combustion process.

Bar 300 shows the total amount of mercury observed after injecting limestone in a stoichiometric molar ratio of 0.35 calcium to sulfur, or at a rate of 0.002 lbs. of limestone per pound of flue gas, into the upper furnace region 28. The total mercury emissions are reduced substantially; 56% of the mercury is removed from the uncontrolled emissions by the alkaline sorbent 14 injection.

In a second test, the results of which are shown by bar 350, limestone was injected into the upper furnace region 28 at a stoichiometric molar ratio of about 0.04 calcium to sulfur, or at a rate of 0.00025 pounds of limestone per pound of flue gas. The lower molar ratio yields less mercury control, with about 45% of the total mercury removed from the uncontrolled emissions. Returning to FIG. 2, the injection system used to provide the alkaline sorbent 14 to each of the different locations in the power plant system 10 may be of any known type for delivering powdered or slurried substances, such as pumps or an air transport system. One advantage of the invention is the alkaline sorbent 14 can be provided from a retro-fit component having a relatively small footprint relative to a full WFGD system for those power plants lacking a WFGD. The cost to install such an injection system is considerably lower than that for a WFGD system.

Since relatively small amounts of alkaline sorbent 14 are injected into the power plant system 10, the cost to provide the alkaline sorbent 14 is relatively inexpensive. Smaller storage silos may be used as well, contributing to a small footprint for an injection retrofit.

The alkaline sorbent injection of the invention also provides additional control over sulfur oxides emissions for plants being retrofit and which lack WFGD systems. The alkaline sorbent 14 injected into the power plant system 10 has the added effect of removing, and thereby reducing amounts of $SO_3$, HCl and other acid gases from the flue gases while also reducing the mercury content.

Lower $SO_3$ levels provide the benefit of reduced acid dew point, allowing further heat removal from the flue gases, as the temperature can be lowered further without generating caustic and corrosive condensate. In turn, lower heat levels for the flue gases at the particulate collection device increases the potential amount of mercury that can be removed, as well as increasing boiler efficiency.

Under certain circumstances, it may be desirable to use a combination of both an alkaline earth sorbent and an alkali metal sorbent to accomplish mercury removal according to the present invention.

Finally, fly ash carbon content can be diluted due to the injection of the alkaline sorbent 14. The amount of unburned carbon found in the fly ash at power plants often dictates the availability of the ash for utilization methods. Diluting the fly ash makes the unburned carbon percentages lower, and thus, the ash will be more desirable for commercial sale. Increased alkalinity of the ash can increase the value of the ash for several applications such as in the agricultural and concrete industries.

While a specific embodiment of the invention has been shown and described in detail to illustrate the application of the principles of the invention, it will be understood that the invention may be embodied otherwise without departing from such principles.

We claim:

1. A mercury removal system for removing mercury from a flue gas generated in a combustion system having a boiler and a stack, comprising:
    an alkaline sorbent source;
    particulate removal means for separating and removing particulate matter containing mercury from a boiler flue gas, the particulate removal means located between the boiler and the stack; and
    sorbent injection means for providing an alkaline sorbent in one of powdered and slurried form to to the boiler flue gas having a temperature below 2000° F., the sorbant injection means being located upstream of the stack and further being fluidically connected to the alkaline sorbent source, the alkaline sorbent containing at least one element selected from the alkaline earth elements and further being provided in a stoichiometric molar ratio of alkaline earth to sulfur of less than 1 mole alkaline earth/mole sulfur.

2. The mercury removal system according to claim 1, wherein the stoichiometric molar ratio is in a range of about 0.001 mole alkaline earth/mole sulfur to about 0.5 mole alkaline earth/mole sulfur.

3. The mercury removal system according to claim 2, wherein the alkaline sorbent comprises one of limestone, lime, a calcium-based sorbent, and a combination thereof.

4. The mercury removal system according to claim 3, wherein the alkaline sorbent comprises limestone.

5. The mercury removal system according to claim 1, wherein the stoichiometric molar ratio is about 0.35 mole alkaline earth/mole sulfur.

6. The mercury removal system according to claim 5, wherein the alkaline sorbent comprises one of limestone, lime, a calcium-based sorbent, and a combination thereof.

7. The mercury removal system according to claim 1, wherein the particulate removal means comprises an electrostatic precipitator.

8. The mercury removal system according to claim 7, wherein the stoichiometric molar ratio is in a range of about 0.001 mole alkaline earth/mole sulfur to about 0.5 mole alkaline earth/mole sulfur.

9. The mercury removal system according to claim 7, comprising means for providing the alkaline sorbent to at least one of upstream adjacent the electrostatic precipitator and upstream adjacent the stack, the stack further comprising separator means for separating and removing particulate containing mercury from the flue gas.

10. A mercury removal system for removing mercury from a flue gas generated in a combustion system having a boiler and a stack, comprising:
    an alkaline sorbent source;
    particulate removal means for separating and removing particulate matter containing mercury from a boiler flue gas, the particulate removal means located between the boiler and the stack; and
    sorbent injection means for providing an alkaline sorbent in one of powdered and slurried form to the boiler flue gas having a temperature below 2000° F., the sorbent injection means being located upstream of the stack and further being fluidically connected to the alkaline sorbent source, the alkaline sorbent containing at least one element selected from the alkali metals and further being provided in a stoichiometric molar ratio of alkali metal to sulfur of less than 1 mole alkali metal/mole sulfur.

11. The mercury removal system according to claim 10, wherein the stoichiometric molar ratio is in a range of about 0.001 mole alkali metal/mole sulfur to about 0.5 mole alkali metal/mole sulfur.

12. The mercury removal system according to claim 11, wherein the alkaline sorbent comprises a sodium-based sorbent.

13. The mercury removal system according to claim 10, wherein the stoichiometric molar ratio is about 0.35 mole alkali metal/mole sulfur.

14. The mercury removal system according to claim 13, wherein the alkaline sorbent comprises a sodium-based sorbent.

15. The mercury removal system according to claim 10, wherein the alkaline sorbent is a sodium-based sorbent.

16. The mercury removal system according to claim 10, wherein the particulate removal means comprises an electrostatic precipitator.

17. The mercury removal system according to claim 10, wherein the particulate removal means comprises an electrostatic precipitator.

18. The mercury removal system according to claim 17, wherein the stoichiometric molar ratio is in a range of about 0.001 mole alkali metal/mole sulfur to about 0.5 mole alkali metal/mole sulfur.

19. The mercury removal system according to claim 17, comprising means for providing the alkaline sorbent to at least one of upstream adjacent the electrostatic precipitator and upstream adjacent the stack, the stack further comprising separator means for separating and removing particulate containing mercury from the flue gas.

20. A mercury removal system for removing mercury from a flue gas generated in a combustion system having a boiler and a stack, comprising:

an alkaline sorbent source;

particulate removal means for separating and removing particulate matter containing mercury from a boiler flue gas, the particulate removal means located between the boiler and the stack; and sorbent injection means for providing au alkaline sorbent in one of powdered and slurried form to the boiler flue gas having a temperature below 2000° F., the sorbent injection means being located upstream of the stack fluidically connected to the alkaline sorbent source, the alkaline sorbent containing a combination of at least one element selected from the alkaline earth elements and at least one element selected from the alkali metals, and the sorbent further being provided in a stoichiometric molar ratio of alkaline earth and alkali metal to sulfur of less than 1 mole alkaline earth and alkali metal/mole sulfur.

* * * * *